United States Patent [19]

Yamamoto et al.

[11] 4,419,163

[45] Dec. 6, 1983

[54] PIPELINE COATING METHOD

[75] Inventors: Mitsuo Yamamoto, Osaka; Takeo Namazugoshi, Shiga; Hiroyoshi Seto, Takatsuki, all of Japan

[73] Assignee: Osaka Gas, Ltd., Osaka, Japan

[21] Appl. No.: 307,333

[22] Filed: Sep. 30, 1981

[51] Int. Cl.³ .......................... B05D 7/22; B32B 1/08
[52] U.S. Cl. ................................. 156/94; 156/224; 427/140; 427/142; 427/230; 427/235; 427/238; 427/239
[58] Field of Search ............... 427/140, 142, 230, 235, 427/238, 239; 156/94, 294

[56] References Cited

U.S. PATENT DOCUMENTS

| | | | |
|---|---|---|---|
| 2,675,333 | 4/1954 | Trout et al. | 427/234 |
| 3,287,148 | 11/1966 | Hilbush et al. | 427/142 X |
| 3,974,306 | 8/1976 | Inamura et al. | 427/233 X |
| 4,325,772 | 4/1982 | Suetoshi et al. | 156/94 X |

*Primary Examiner*—James R. Hoffman
*Attorney, Agent, or Firm*—Edwin E. Greigg

[57] ABSTRACT

A one step method of applying a sealant onto the inside surface of a pipe, such as a gas pipe, to repair any defective portions that are likely to cause a leak and should be repaired. The sealant is applied and it is then dried and solidified to seal the leak portions of the pipe. Preferably, an injection means is used for supplying the sealant in a cylindrical shape so that every portion of the inner surface of the pipe will be coated.

6 Claims, 15 Drawing Figures

PIPELINE COATING METHOD

BACKGROUND OF THE INVENTION

The present invention relates to a method of coating the inner wall surface of a pipe in a pipeline, in particular a gas pipe, with a sealant supplied as foam into the pipe, thereby to repair defective portions of a pipe which causes a gas leak, or to prevent the pipe from a gas leak.

A method of coating the inner wall surface with a sealant has a first step of filling the inside of a pipe in a pipeline with a sealant, and a second step of discharging any surplus sealant to the outside of the pipe. On the first step, the pipe is filled with the sealant for a predetermined period of time, thereby assuring that the sealant penetrates to the defective portions of the pipe which are likely to cause a gas leak, as well as providing sufficient time for the sealant to adhere to the inner wall surface of the pipe. On the second step, air is blown through the sealant filled pipe to discharge any surplus sealant from the pipe, while permitting the sealant which has adhered to the inner wall surface to remain on the inner wall of the pipe.

According to such a conventional method, however, the working efficiency is inevitably low in that the charging and discharge of the sealant are made in the two steps respectively. Furthermore, such a conventional method is uneconomical in that more sealant is used than is necessary to coat the pipe. Therefore, a lot of time is required for charging the pipe with sealant.

Moreover, during the coating of the inner wall surface with sealant, a portion of the charged sealant liquifies to increase the discharge resistance, so that discharge takes quite a lot of time.

In addition, the step of switching operation requires much time and, if one apparatus is constructed to handle these two steps, the whole structure inevitably becomes complicated.

SUMMARY OF THE INVENTION

In view of the foregoing, the present invention has an object to provide a method of coating the inner surface of a pipe in a pipeline very efficiently and economically, in which a required working period of time can be drastically reduced and the necessary amount of sealant agent can be reduced sharply.

According to the present invention, a sealant is cylindrically supplied to the inside of a pipe so that the sealant adheres or sticks to the inner surface of the pipe in the axial direction, such sealant supply and sticking being performed in one step. Thereafter, the sealant is allowed to dry and solidify.

Preferably, the sealant is foamy or in a foamed state, but may also be liquid.

Various methods are available for supplying the sealant in a cylindrical arrangement and causing the sealant to stick to the inner surface of a pipe in one step.

According to a first method, a sealant and compressed air are supplied respectively centrally along the inner surface of the pipe at the same time such that the sealant agent flows annularly. In such a case, there may be disposed, at one end of the pipe, a promoting means for assuring such annular flow, through which foamy sealant and compressed air are supplied.

According to a second method, a liquid sealant and compressed air may be supplied in the gas-liquid mixture phase. In such a case, the gas-liquid mixture flow varies in state with the air flow speed in the pipe. Namely, at a low speed, the liquid and gas flows as horizontally or is vertically separated, such as in a plug flow, wavy flow or stratiform flow. At a speed in a predetermined range, the sealant flows in a favorable annular flow. At a speed exceeding such predetermined range, the gas-liquid mixture flow flows in a spray flow, which is not suitable for the coating purpose.

According to a third method, a pipe of small outer diameter is inserted in the pipeline, a foamy sealant is supplied to the cylindrical gap formed between these two pipes, and the pipe of smaller diameter is then removed.

This third method is suitable for a large-diameter straight pipe, but cannot be applied to a curved or angular pipe, while the first and second methods can be applied also to a curved or angular pipe.

When coating a cylindrical film to the inner surface of a pipe is desired, a sealant having an adhesive property is selected. After such adhesive sealant has been cylindrically introduced and has stuck to the inner surface, a cylindrical film is introduced into the pipe before the sealant is dried and solidified, and such film may be pressed to the inner surface by suitable means.

As thus discussed hereinbefore, the inner surface coating method for a pipe according to the present invention is characterized in that, while a sealant and compressed air are supplied to the inside of a pipe as a gas-liquid two-phase flow such that the sealant cylindrically flows along the pipe inner surface, the sealant cylindrically sticks to the inner surface in the axial direction, and the sealant is then allowed to dry and solidify. Therefore, according to the present method, a predetermined coating effect can be obtained, while supply and discharge of the sealant to and from the pipe are simultaneously performed in one step.

As compared with a conventional method in which a supply and discharge are respectively performed in two steps, the present method can drastically reduce the necessary working period of time and the amount of sealant to be used. In other words, according to the present invention, a predetermined coating can be realized very efficiently and economically.

BRIEF DESCRIPTION OF THE DRAWINGS

The present invention will be further described, by way of example, with reference to the accompanying drawings, in which.

DETAILED DESCRIPTION OF THE PREFERRED EMBODIMENTS

Figure 1:
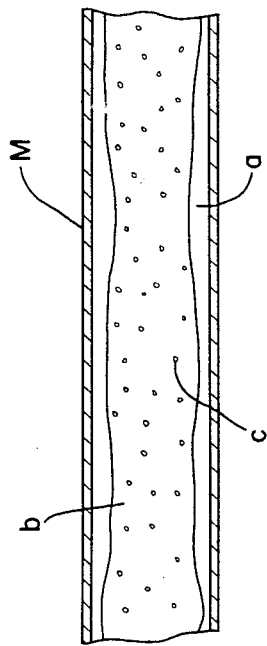
FIG. 1 is a section view for explaining a first embodiment of a method of coating the inner wall surface of a pipe according to the present invention.

A foamy or foamed sealant is supplied to the inside of a pipe together with compressed air under the proper conditions to provide an annular flow state. The term of the annular flow condition is herein defined as a flow condition in which a major portion of the liquid or foamy sealant a flows in a cylindrical layer state along the inner surface of a pipe m, while air b flows centrally of the pipe with minute particles c of the sealant floatingly moved in the air layer, as shown in FIG. 1.

The following table shows typical conditions to provide such annular flow state, as the relationship among the pipe diameter, the necessary air amount and the air flow speed under the condition that the sealant is foamed:

| Pipe diameter | Necessary air amount | Air flow speed in pipe |
| --- | --- | --- |
| ¾ inch | 100 liters/min. | 4.6 m/second |
| 1 | 170 | 4.7 |
| 1¼ | 265 | 4.4 |
| 1½ | 385 | 4.7 |
| 2 | 650 | 4.9 |

In FIGS. 2 to 7, an air compressor 1 compresses and supplies air. The air is suitably adjusted in pressure by pressure regulator valves 2 and 3, and flows by a necessary amount to provide the annular flow condition with the use of flow-rate controllers 4 and 5. The air passed through the upstream flow-rate controller 4 is supplied directly to an injection device 6 disposed for aiding the formation of the annular flow. The air passed through the downstream flow-rate controller 5 is sent to the nozzle 7a of a device 7 which causes the sealant S to foam. The foamed sealant S' is then directed to the injection device 6.

Figure 3:
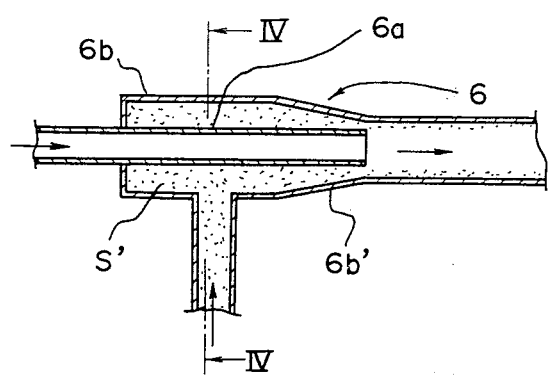
FIG. 3 is a vertical section view of a device for coating the inner wall surface of a pipe.
Figure 4:
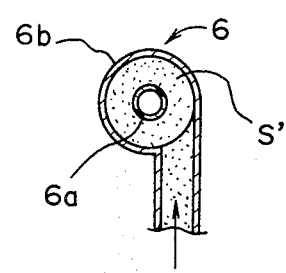
FIG. 4 is a sectional view taken along the line IV—IV in FIG. 3.

As shown in FIGS. 3 and 4, the injection device 6 has an inner-outer double cylindrical structure. The air is supplied to the inner tube 6a, while the foamed sealant is spirally supplied to the outer tube 6b in the tangential direction. The spirally flowing foamed sealant S' is throttled at the tapered portion 6b' of the outer tube 6b and is converted into a cylindrical flow along the inner surface in the axial direction by the air flowing from the end of the inner tube 6a. Thus, a flow in the annular flow condition is provided, and such a flow is maintained in a hose 8 between the injection device 6 and a pipe M to be coated, along the entire length thereof. Thus, the sealant cylindrically sticks to the inner surface of the pipe M in the axial direction.

Figure 5:
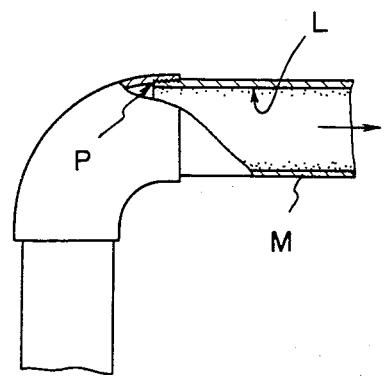
FIG. 5 is an elevational view, with portions broken away, of an elbow portion in FIG. 2.

The coating method can be understood in more detail with reference to FIG. 5, in which there are simultaneously performed the penetration P of the sealant to the joint portions from which gas is likely to leak, and the lining L by the sealant on the wall surface. It is to be noted that any excess sealant is discharged simultaneously with the supply thereof.

A pressure gauge is generally designated by 9.

The foamed sealant and the air that passes through the pipe M are collected by a recovering container 12 through a hose 11 connected to a cock 10 and to the end of the pipe being coated.

In the container 12, the liquid and the gas are separated from each other, and only the air is discharged outside, while the sealant is collected.

After the foamed sealant S' has been supplied for a predetermined period of time, a valve 13 is closed to send only air through the pipe so as to dry and solidify the sealant stuck to the inner surface of the pipe M. Partial drying and solidification begins immediately by the air passing centrally through the pipe at the stage where the foamed sealant has been applied.

Figure 7:
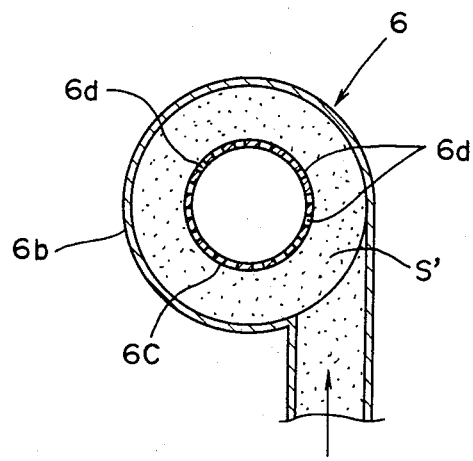
FIG. 7 is a sectional view taken along the line VII—VII in FIG. 6.
Figure 6:
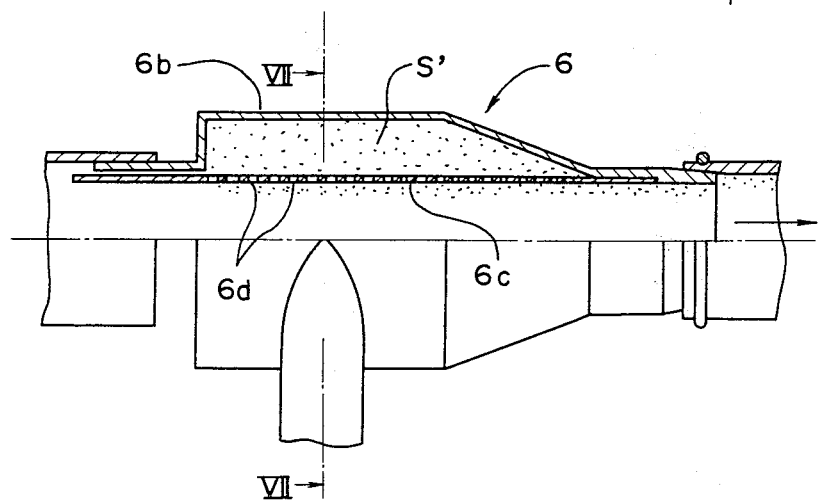
FIG. 6 is a vertical sectional view of another example of the coating means.

A promoting device shown in FIGS. 6 and 7 can be used in which the foamed sealant S' is spiralled on the outer periphery of a net or porous member 6c, while such sealant S' is sucked through slits 6d by air passing through the inside of the net or porous member 6c in the axial direction, whereby the annular flow condition can be provided.

Comparison has been made between the present method and a conventional method on a pipe of 1 inch diameter and 7.5 meters in length.

The charge and discharge of sealant took 2 hours according to the conventional method, and 0.7 hours according to the present method.

The consumption of liquid sealant was 9.5 liters according to the conventional method, and 4.1 liters according to the present invention.

According to the present invention, the amount of air passing through the flow-rate controllers 4 and 5 was 190 liters/min. and 20 liters/min., respectively, and the pressure detected by the pressure gauge 9 was 0.2 kg/cm2.

Athough a foamed sealant has been used in the embodiment above-mentioned, a liquid sealant may also be used.

The description hereinafter will discuss the second embodiment with reference to FIGS. 8 to 10.

The coating method according the second embodiment is characterized in that a liquid sealant with a compressed air serving as carrier gas forms a gas-liquid mixture which flows in an existing pipe at such high speed as to provide an annular flow therein which coats the inner surface of the pipe, in particular any concave or defective portions are coated with the sealant.

Figure 8A:
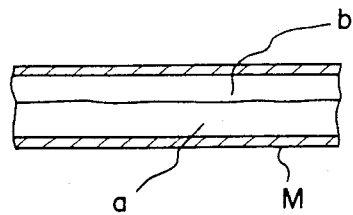
FIG. 8A to 8C are sectional views for explaining a second embodiment of the present invention.
Figure 8B:
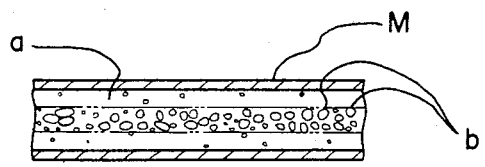
Figure 8C:
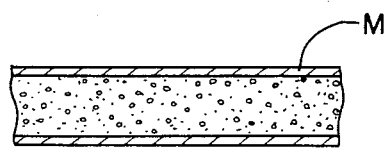

With the increase in the speed of the gas-liquid mixture flow, its flowing state undergoes changes as shown in FIGS. 8A to 8C. Firstly, as shown in FIG. 8A, the liquid sealant a and the gas b flow respectively at the lower portion and the upper portion of the pipe M, thereby forming a stratiform flow. Then, as shown in FIG. 8B, the liquid sealant a flows along the inner surface of the pipe M, while the gas b flows centrally of the pipe M at a high speed, thereby forming an annular flow. Finally, as shown in FIG. 8C, a major portion of the sealant a flows in a sprayed condition, thereby forming a spray flow. As seen in the drawing, the annular flow is utilized for the coating purpose.

Figure 9:
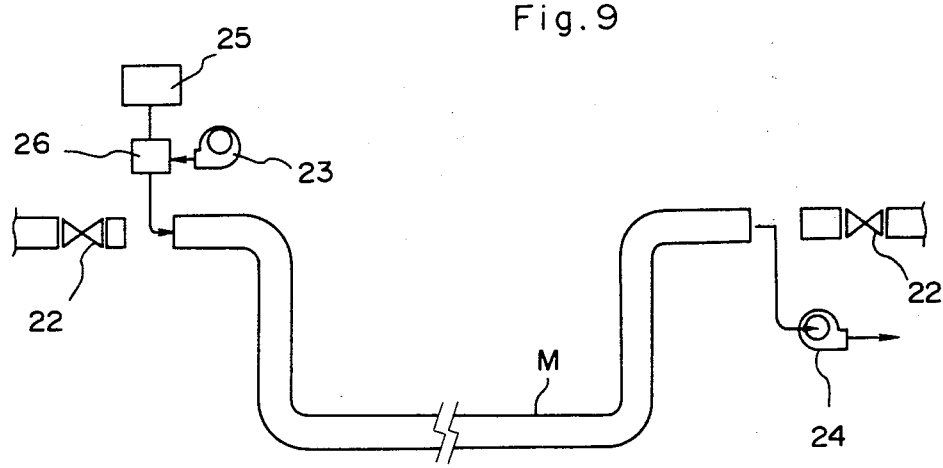
FIG. 9 is a schematic diagram of a piping system to which the second embodiment is applied.

The description will discuss how such an annular flow works in a pipe, with reference to FIG. 9.

An air supply blower 23 and an air exhaust blower 24 are connected to an existing pipe M having angularly turned portions, with both ends of the pipe M closed by valves 22. A liquid sealant a is supplied from a tank 25 to a mixer 26. Such sealant a forms a gas-liquid mixture flow together with a carrier gas b supplied from the air supply blower 23 and exhausted by the air exhaust blower 24. Such gas-liquid mixture flow flows in the existing pipe M at a high speed sufficient to provide the annular flow shown in FIG. 8B. Thus, the sealant a can be accumulated on concave portions, holes, cracks or rough portions of the pipe M which may otherwise cause a leak. Sealing and smoothing treatment can be thus performed on the pipe M.

Any surplus sealant is separately collected by a gas-liquid separator disposed on the end of the exhaust line, or may be recirculated through the mixer 26.

When provision is made for supplying the liquid sealant a in a misty state to some degree, the gas-liquid mixture can flow advantageously at a lower speed in the annular flow.

Figure 10:
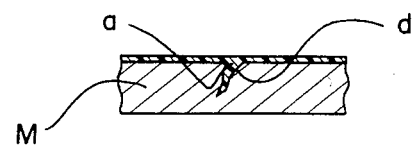
FIG. 10 is a sectional view of the main portions in FIG. 9.

As shown in FIG. 10, such a method can provide a particular effect of securely and easily sealing a small defective portion d of the pipe M with a sealant a.

Figure 11:
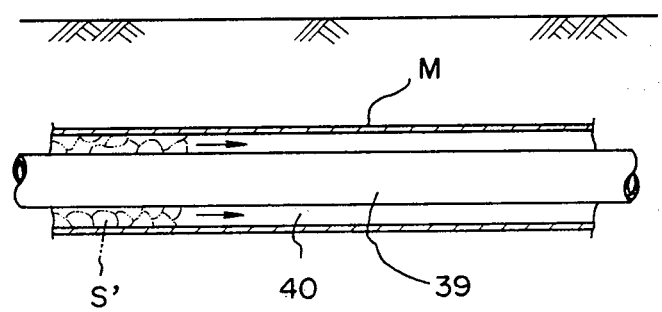
FIG. 11 is a sectional view for explaining a third embodiment of the present invention.

FIG. 11 illustrates another embodiment where the present method is applied to a large-diameter gas main pipe M laid under the ground, for the purpose of repair of leaks.

In this embodiment, since the gas main pipe M has a large diameter, there is inserted into such main pipe M, coaxially or substantially coaxially, a pipe 39 having an outer diameter slightly smaller than the inner diameter of the main pipe M. With the use of a foaming device similar to the device 7 in FIG. 2, a foamed sealant S' is supplied to the cylindrical space 40 between the main pipe M and the pipe 39. Thereafter, air is supplied to the space 40 to discharge a surplus sealant. The pipe 39 is then removed and washed, while the cylindrical sealant remaining in the gas main pipe M is allowed to dry and solidify.

Figure 2:
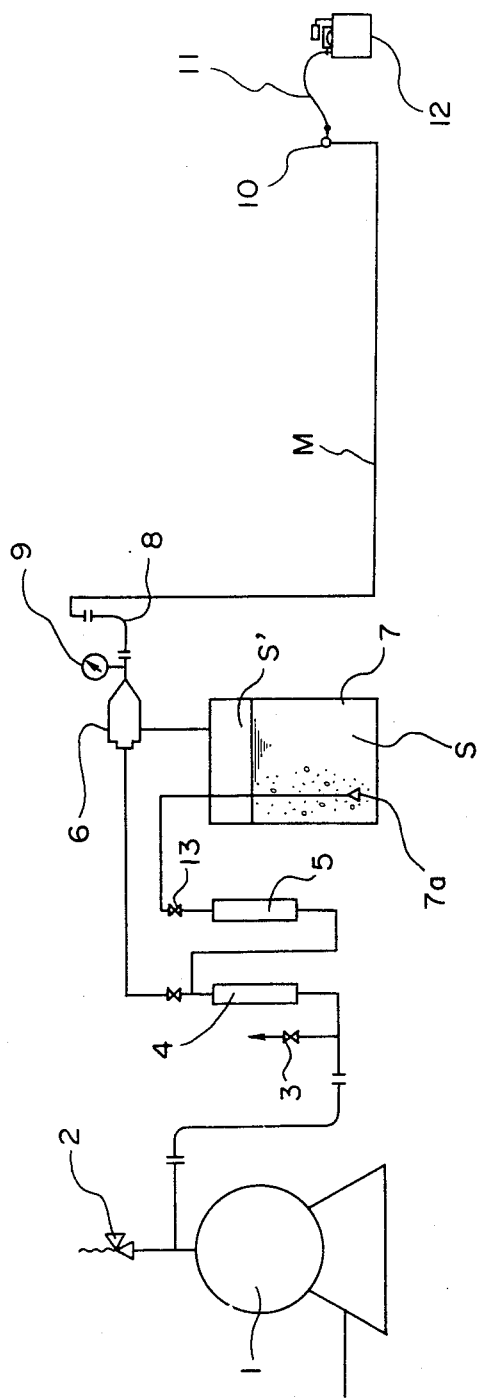
FIG. 2 is a schematic diagram of a piping system to which the first embodiment is applied.

In such an example, the injection device 6 in FIG. 2 is not required.

The use of a flexible tube in place of the pipe 39 may advantageously facilitate such leak repair work.

In the sealing treatment on a large-diameter straight pipe in a pipeline as shown in FIG. 11, the required amount of sealant S can be sharply reduced, and drying and solidification of sealant can be made faster, whereby repair work can be performed efficiently and economically.

It is generally desired to conduct a leak test on the pipe for measuring its degree of leakage, prior to the execution of a seaing treatment on the inner surface of the pipe according to the present method.

If such test reveals the degree of leakage to be more than a predetermined value, a lining treatment may be combined with the sealing method of this invention to provide a cylindrical film over the sealant coating to further prevent leakage. Such a combination treatment may also be desired in order to prevent any leak recurrence or for preventive maintenance.

In such a lining treatment, a sealant having an adhesive property (hereinafter referred to as a bonding agent) may be used, and such bonding agent may be applied readily, speedily and uniformly according to either of the methods discussed hereinbefore.

The film lining treatment method is characterized in that a bonding agent layer is cylindrically formed on the inner surface of a pipe in the axial direction and a cylindrical thin film is then inserted in and stuck to the inner surface of the cylindrical bonding agent layer.

Figure 12:
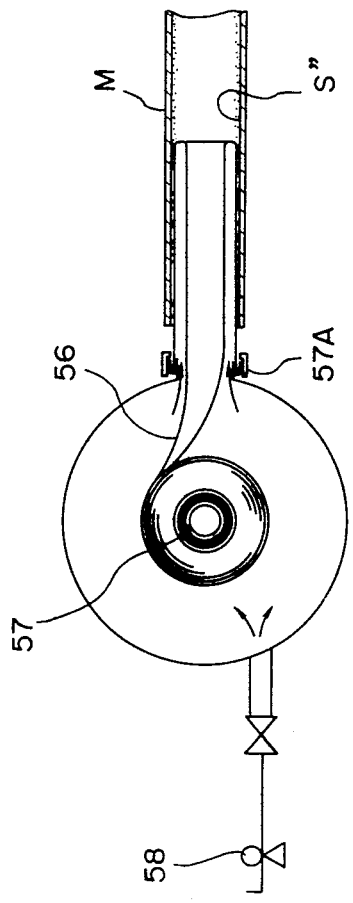
FIG. 12 is a sectional view for explaining a fourth embodiment of the present invention.

As shown in FIG. 12, a cylindrical bonding agent layer S'' is formed on the inner surface of the pipe M, and a thin and sufficiently resilient cylindrical film 56 such as a polyethylene film is inserted inside the cylindrical layer S'' according to an inversion method.

Figure 13:
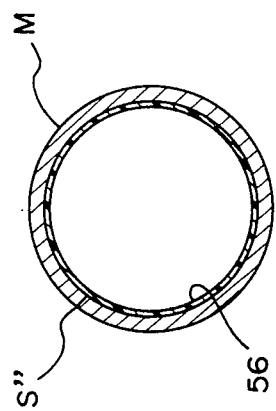
FIG. 13 is a sectional view of a pipe to which the fourth embodiment has been applied.

Namely, the tip end of the film 56 wound on a drum 57 is outwardly turned and tightly fixed to the film outlet port 57A of a casing containing the drum 57. Air is then sent to the turned portion of the film to extend it longitudinally of the pipe by means of a blower 58 communicatingly connected to said casing. By such supply of air, the film 56 is inserted from the outlet port 57A into the pipe M, while the inner surface of the film 56 wound on the drum 57 is continuously inverted so as to be exposed to the outside. Due to the air pressure exerted on the turned portion of the film, the turned film 56 is extended also in the radially outward direction and sticks to the bonding agent layer S'' uniformly both in the radial and axial directions. When the film 56 reaches the other end of the pipe M, the blower 58 is stopped and the film 56 is cut, the section of which is shown in FIG. 13. The unnecessary film portion is then rewound on the drum 57 before completing the leak repair work.

For insertion of the cylindrical film 56, a pig method may also be used, in addition to the inversion method.

According the pig method, after the bonding agent layer S'' has been formed, the film 56 is tied up with the end of a guiding thread member previously inserted into the pipe M, and then by pulling this guiding thread member, the film 56 is inserted into the pipe M.

In addition to gas pipes, the present method may also be applied to water or cable pipes. The present method may be applied not only to repair leaks, but also to preventive maintenance work for new pipe which exhibits no leakage, or for existing pipes undergoing some corrosion.

What we claim is:

1. A method for coating an inner surface of an elongated pipe comprising the steps of supplying a foamed sealant cylindrically along the inner surface of said pipe, directing a compressed air flow centrally of said foamed sealant to drive said sealant along the inner surface of said pipe wherein said sealant sticks to said inner surface over an entire length thereof while flowing in an annular condition along said inner surface of said pipe, and allowing said sealant to cure on the inner surface of said pipe with any excess foam forced from said pipe by said compressed air.

2. A method as set forth in claim 1 wherein said compressed air flow centrally of said foamed sealant is at a rate greater than 4 meters per second thereby maintaining said foamed sealant in an annular flow condition.

3. A method as set forth in claim 2 wherein the annular flow condition of aid sealant is assured by securing an injection device to one end of said pipe, said injection device including an inner-outer double tube structure from which said air flows from said inner tube and said sealant flows spirally between the inner tube and outer tube and is injected cylindrically into said pipe from between said inner tube and said outer tube.

4. A method as set forth in claim 2 wherein said foamed sealant and compressed air are simultaneously supplied along said pipe.

5. A method as set forth in claim 1 wherein the annular flow condition of said sealant is assured by securing an injection device to one end of said pipe, said injection device including an inner-outer double tube structure from which said air flows from said inner tube and said sealant flows spirally between the inner tube and outer tube and is injected cylindrically into said pipe from between said inner tube and said outer tube.

6. A method as set forth in claim 1 wherein said foamed sealant and compressed air are simultaneously supplied along said pipe.

* * * * *